106. COMPOSITIONS, COATING OR PLASTIC.

80

Patented Oct. 26, 1926.

1,604,904

UNITED STATES PATENT OFFICE.

TANCRÈDE G. GAUDRY, OF MONTREAL, QUEBEC, CANADA, ASSIGNOR TO ARTHUR HOOLAHAN, OF MONTREAL, CANADA.

PAINT FILLER AND PROCESS OF PREPARING IT.

No Drawing.   Application filed May 12, 1923.   Serial No. 638,662.

This invention relates to a method or process of mixing and preparing paint fillers or compositions adapted to be added to paints for the purpose of improving the qualities of the paints for certain definite purposes. One of the principal objects of the invention is to provide a suitable composition which will readily mix with oils and turpentine, and which will give to the paint product greater elasticity and greater adhesiveness when applied to any surface.

A further object is to render the paints non-corrosive and resistant to weather, temperatures and atmospheric conditions which, ordinarily, affect the preservative qualities of paints.

A further object is to increase the life of the coloring pigments in paints which have been used for decoration of exposed surfaces. Other objects will appear from the description hereinafter set forth.

My invention consists essentially in preparing and mixing a composition of ingredients which will readily mix with the oils and spirits used in the manufacture of paint, and which will remain in suspension in the paint for long periods, without precipitation or deterioration. In describing my process I will explain the various steps successively for preparing a composition of approximately 100 gallons of paint filler adapted to be mixed in suitable proportions with the paint ingredients.

To make a mixture of about 100 gallons of paint filler I first melt approximately 4½ pounds of commercial rosin under heat with a steam pressure of about 25 pounds, thereby bringing the melted rosin to 212° F. Steam is then shut off and about 1 gallon of wood alcohol or methylated spirits is mixed with the melted rosin. In effecting this mixture the alcohol is first poured slowly into the rosin until the latter thins down when the rate of pouring may be increased until the alcohol is all in and thoroughly mixed. This mixture is then allowed to cool and will be referred to as mixture No. 1.

The next step consists in the preparation of a composition which will be referred to as mixture No. 2 and is prepared in the following manner. Approximately 2 oz. of oxalic acid, 8 oz. of alum and 10 pounds of washing soda are thoroughly dissolved in two to three gallons of water, the solution being made in a receptacle under a steam pressure of about 25 pounds. Mixture No. 1 is then mixed with solution No. 2 while the latter is still hot. The materials are then agitated until the solutions are thoroughly mixed.

The third step consists in dissolving or mixing the following ingredients, separately, preferably under steam pressure, each in about one gallon of water and then adding each dissolved mixture in order, successively, to the composition produced by combining mixtures No. 1 and No. 2. First, approximately 4 oz. of potassium dissolved in one gallon of hot water, under steam pressure, is added to the combined mixtures No. 1 and No. 2. Second, approximately 5 oz. of zinc sulphate thoroughly agitated in one gallon of hot water, under steam pressure, is next added to the mixture. Third, 2½ to 3 pounds of sugar of lead or acetate of lead mixed in one gallon of hot water is added to the mixture. Fourth, one pound of gum arabic melted under steam pressure and mixed in one gallon of hot water is added to the mixture. Fifth, 5 oz. of caustic soda dissolved in one gallon of water is added to the mixture and, finally, about 4 pounds of silicate of sodium, or water glass, dissolved in one gallon of hot water is added to the mixture which, during this period of mixing, is thoroughly agitated to bring all the ingredients into intimate contact. The whole mixture is then poured into approximately 90 gallons of water and thoroughly agitated, when it is allowed to remain in a tank at a temperature of from 50° to 70° F. for approximately 24 hours. It is then filtered after which it is ready for marketing to be mixed in suitable quantities with paints, oils or turpentine spirits entering into the composition of paints.

The proportion of this filler to be mixed with paints may vary not only with the kind of paint, but with the purposes for which the paint is to be used. For paints adapted for inside decoration and the like approximately 3 quarts of filler may be mixed with one gallon of paint. For paints employed for outside decoration where surfaces are exposed to the weather 3 to 4 quarts of filler may be mixed with one gallon of paint. To produce a non-corrosive paint and for use on surfaces exposed to salt water, acid fumes or the like, I find that approximately 4 to 5 quarts of the filler may be mixed with one gallon of paint.

This composition will mix readily and thoroughly with paint oils and volatile liquids. It will not precipitate to any extent but will remain in suspension in the paint and will add very materially to its adhesive qualities, to its freeness in spreading, to its resistance to atmospheric conditions, to its preservative qualities and to the life and stability of its coloring materials.

Having thus described my invention, what I claim is;—

A process of preparing a paint filler which consists in first dissolving rosin under steam pressure and then adding to the rosin, methylated spirits, then mixing the solution with a second solution of oxalic acid, alum and washing soda dissolved in water, under steam pressure, then adding to the composition, first, a mixture of potassium hydroxide, second, a solution of zinc sulphate in water, third, a mixture of acetate of lead in water, fourth, a solution of gum arabic in water, fifth, a solution of caustic soda in water, sixth, a solution of silicate of sodium in water, then thoroughly stirring the complete mixture in a large volume of water.

In witness whereof I have hereunto set my hand.

TANCRÈDE G. GAUDRY.